United States Patent [19]

Sakaguchi et al.

[11] Patent Number: 4,478,376

[45] Date of Patent: Oct. 23, 1984

[54] METHOD OF WINDING MAGNETIC RECORDING TAPE

[75] Inventors: Masaaki Sakaguchi; Shinichi Satoh; Seiji Kiuchi; Hiroshi Chikamasa, all of Odawara, Japan

[73] Assignee: Fuji Photo Film Co. Ltd., Japan

[21] Appl. No.: 454,273

[22] Filed: Dec. 29, 1982

[30] Foreign Application Priority Data

Jan. 13, 1982 [JP] Japan .................................. 57-3972

[51] Int. Cl.$^3$ ...................... B65H 59/38; G03B 1/02; G11B 15/13

[52] U.S. Cl. .................................... 242/191; 360/73; 360/74.1

[58] Field of Search ............... 242/186, 191, 203, 196, 242/75.5, 75.51, 201; 318/7, 6; 360/71, 73, 74.1, 74.2, 137

[56] References Cited

U.S. PATENT DOCUMENTS 3,913,866 10/1975 Hankins ............................... 242/191
4,224,645 9/1980 Mauch ................................... 360/73
4,347,538 8/1982 Klank ................................... 360/137

FOREIGN PATENT DOCUMENTS 56-26904 6/1981 Japan .

Primary Examiner—Leonard D. Christian
Attorney, Agent, or Firm—Saidman, Sterne & Kessler

[57] ABSTRACT

A method of winding a predetermined length of magnetic recording tape from a large reel (on which the tape is initially wound), onto a small reel, in which the running speed of the tape is gradually increased at the beginning stage of each winding cycle to a predetermined high speed, is subsequently kept at the high speed, and is gradually slowed down near the end of the cycle, and then the tape is finally stopped to end the cycle. Simultaneously with the beginning of each winding cycle, an encoder begins to generate a pulse train, the number of pulses of which is in proportion to the number of rotations of the small reel. The number of pulses in the pulse train is counted and the tape running speed is gradually slowed down when the number of pulses counted reaches a predetermined value according to the time at which the tape running speed is to be gradually slowed down.

3 Claims, 3 Drawing Figures

METHOD OF WINDING MAGNETIC RECORDING TAPE

BACKGROUND OF THE INVENTION

1. Field of the Invention

This invention relates to a method of winding a magnetic recording tape such as a video recording tape or an audio recording tape wound on one winding frame, onto another winding frame such as the hub or the reel of a cassette or a cartridge, and more particularly to a method of winding such a recording tape fed from a tape source in the form of a large winding frame on which a long roll tape is wound, onto a small winding frame when manufacturing a tape cassette, a tape cartridge or the like.

2. Description of the Prior Art

There is known a tape winding apparatus for dispensing a long roll magnetic recording tape wound on a large tape source reel in predetermined lengths onto smaller reels or hubs. In the known tape winding apparatus, the tape speed at which the magnetic recording tape is wound on the smaller reel is carefully controlled so that the tape is wound on the smaller reel in a desirable state in a short time without the tape being stretched and without the winding surface being brightened. Typically the tape speed is gradually increased to a high speed at the beginning stage of each winding cycle, is then kept at the constant high speed and is gradually slowed down at the end of the winding cycle to be finally stopped, or the tape speed is gradually increased to a high speed at the beginning stage of each winding cycle, is then kept constant at the high speed, is gradually slowed down to a lower speed near the end of the winding, is kept constant at the lower speed for a while, and then is completely stopped. Further in the known winding apparatus, a tension arm is provided to give proper tension to the running tape with a predetermined tension pattern. For example, a relatively strong tension is imparted to the tape at the beginning stage of each winding cycle and a relatively weak tension is imparted to the tape near the end of each winding cycle. Particularly, when the tape is extremely thin, unevenness of winding is apt to be generated unless tension is imparted to the tape with said predetermined tension pattern. Known systems for controlling the tape speed include a feed-back control system and a capstan-pinch-roller system.

However the capstan-pinch-roller system is not suitable for high speed winding since it cannot follow rapid changes in tape tension. Although the feedback control system is suitable for high speed winding, the conventional feed-back control system has the drawback that the electric circuit thereof is complicated and accordingly the system is expensive. For example, in the tape winding apparatus employing the feed-back control system disclosed in Japanese Patent Publication 56(1981)-26904, the feed-back control system comprises a reference voltage generator and a comparator; a voltage corresponding to the measured tape running speed is compared, by the comparator, with the reference voltage outputted from the generator to control the tape running speed. Therefore, the electric circuit of the feed-back control system is inherently complicated and expensive.

SUMMARY OF THE INVENTION

In view of the foregoing observations and description, the primary object of the present invention is to provide a magnetic recording tape winding method by which the magnetic recording tape can be stably wound at a high speed and which can be carried out by a relatively inexpensive system.

The method of the present invention is characterized in that the tape running speed is changed, e.g., is gradually slowed down, when the number of pulses in a pulse train which is caused to start simultaneously with the beginning of each winding cycle reaches a predetermined value determined in advance according to the time at which the tape running speed is to be changed.

In the method of the present invention, the timing for changing the tape running speed in each winding cycle can be detected by using only a pulse generator and a comparator. Therefore, the method of the present invention can be carried out by a simple and inexpensive circuit. Further, according to the method of the present invention, an open loop control system, which is simpler than the feed-back control system, can be employed. Further with the method of the present invention, the tape can be wound at a high speed since the capstan-pinch-roller system is not used.

Further, since the value processed by the pulse generator and the comparator is a digital value, the winding operation can be precisely controlled.

DESCRIPTION OF THE PREFERRED EMBODIMENT

Figure 1:
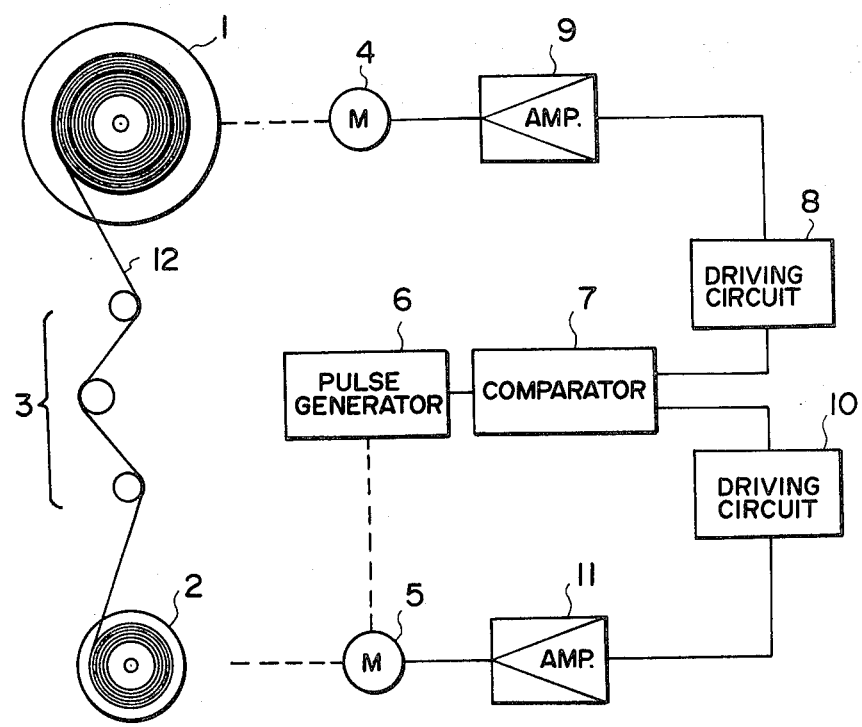
FIG. 1 is a schematic view showing an example of a winding apparatus for carrying out the method of the present invention.

FIG. 1 is a schematic view showing an example of a winding apparatus for carrying out the method of the present invention. In FIG. 1, a roll magnetic recording tape 12 wound on a large reel 1 is taken up by a small reel 2 passing a pass roll section 3. An electric motor 5, referred to below as the "take-up motor", for driving the small reel 2 is provided with an encoder (not shown) which begins to operate simultaneously with the beginning of each winding cycle and converts the number of rotations of the motor 5 into a pulse train proportional to the number of rotations. The outputted pulse train is inputted into a pulse generator 6. The number of pulses in the pulse train is counted in the pulse generator 6 and the count is inputted into a comparator 7. The comparator 7 compares the count with a predetermined digital value determined in advance according to the time at which the tape speed is to be changed, and outputs an incidence signal when the former and the latter coincide with each other. The incidence signal is inputted into driving circuits 8 and 10 for a feed-out motor 4 and the take-up motor 5, respectively. The feed-out motor 4 drives the large reel 1 and the take-up motor 5 drives the small reel 2. The driving circuits 8 and 10 change the voltage of the motor driving signals to be inputted into the feed-out motor 4 and the take-up motor 5, respectively. The motor driving signals are inputted into the respective motors 4 and 5 through power amplifiers 9 and 11, respectively. The take-up motor 4 and the feed-out motor 5 rotate the large reel 1 and the small reel 2 in synchronization with each other so that a desired tension is imparted to the tape 12 under the control of the driving signals.

In one embodiment of the present invention, the rotational speed of the large reel 1 is gradually increased at the beginning stage of each winding cycle to a high speed, and is then kept constant at the high speed. When the number of rotations of the small reel 2 reaches a predetermined first number, the rotational speed of the large reel 1 is gradually lowered until the number of rotations of the small reel 2 reaches a predetermined second number, and then the large reel 1 is completely stopped. On the other hand the rotational speed of the small reel 2 is gradually increased at the beginning stage of each winding cycle to a high speed, and then kept constant at the high speed. When the number of rotations thereof reaches said predetermined first number i.e., when the rotational speed of the large reel 1 begins to gradually lower the rotational speed of the small reel 2 is changed to a lower speed. Then the rotational speed of the small reel 2 is kept constant at the lower speed until the number of rotations thereof reaches said predetermined second number and the large reel 1 is completely stopped. When the large reel 1 is completely stopped, the small reel 2 is also stopped though a very small torque is imparted to the small reel 2 by the take-up motor 5 even after the large reel 1 is stopped as will be described in more detail hereinbelow.

Figure 2:
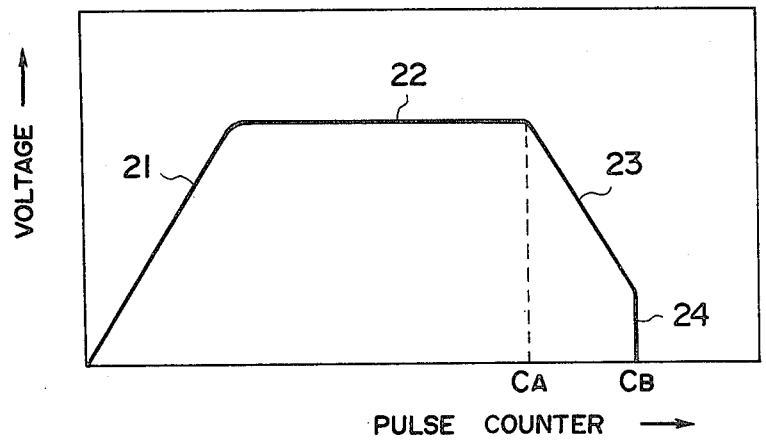
FIG. 2 is a graph showing the relationship between the pulse count of a pulse generator and the voltage of the driving signal inputted into an electric motor for driving a large reel from which the tape is fed out in the apparatus of FIG. 1.
Figure 3:
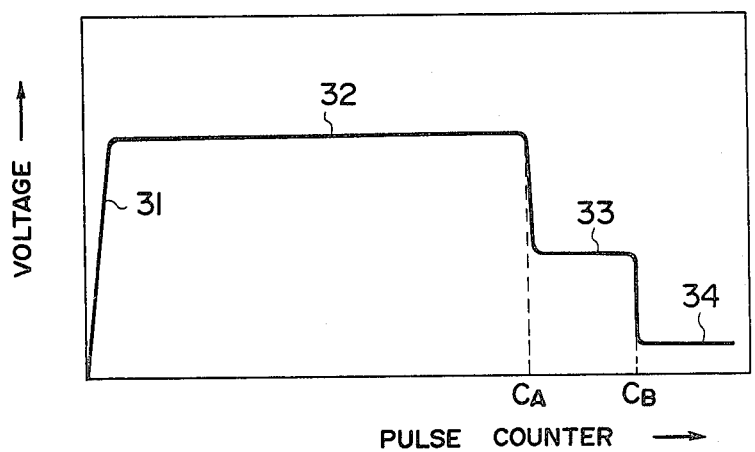
FIG. 3 is a graph showing the relationship between the pulse generator pulse count and the voltage of the driving signal inputted into an electric motor for driving a small reel on which the tape fed out from the large reel is wound.

In order to control the rotational speed of the large reel 1 and the small reel 2 in the manner described above, the voltage of the driving signals respectively inputted into the feed-out motor 4 and the take-up motor 5 are controlled as shown in FIGS. 2 and 3, respectively. In FIG. 2, the voltage of the driving signal to the feed-out motor 4 is gradually increased at the beginning stage of each winding cycle to a predetermined high level as indicated at 21, which will cause the feed-out motor 4 to rotate the large reel at said high speed, and is then kept constant at the high level as indicated at 22. When the pulse count of the pulse generator 6 reaches value CA corresponding to said first number of rotations of the small reel 2, the comparator 7 outputs an incidence signal. The driving circuit 8 gradually lowers the voltage of the driving signal to the feed-out motor 4 upon receipt of the incidence signal as indicated at 23. When the count of the pulse generator 6 reaches value CB corresponding to said second number of rotations of the small reel 2, the comparator 7 outputs another incidence signal and the driving circuit 8 turns off the driving signal to the feed-out motor 4 upon receipt of the incidence signal, as indicated at 24.

In FIG. 3, the voltage of the driving signal to the take-up motor 5 is gradually increased at the beginning stage of each winding cycle to a predetermined high level, as indicated at 31, which will cause the take-up motor 5 to rotate the small reel 2 at said high speed, and is then kept at the high level. When the count of the pulse generator 6 reaches the value CA, the driving circuit 10 receives the incidence signal and changes the voltage of the driving signal to the take-up motor 5 to a first lower level as indicated at 33. The voltage of the driving signal to the take-up motor 5 is then kept constant at the first lower level until the count of the pulse generator 6 reaches the value CB. When the count reaches the value CB, the driving circuit 10 receives the incidence signal and changes the voltage of the driving signal to a second lower level as indicated at 34. At the second lower level the take-up motor 5 only exerts a very small torque which is only sufficient to impart a predetermined tension to the tape after the large reel 1 is stopped. The rotational speed of the large reel 1 when the voltage of the driving signal thereto is at the lowermost level in the gradually lowering stage and the rotational speed of the small reel 2 when the voltage of the driving signal thereto is at the first lower level are selected not to impart excessive force to the tape 12 when both the reels 1 and 2 are abruptly stopped.

As described above, in the method of the present invention, the timing of changing the tape running speed is digitally controlled by simply counting the number of pulses starting simultaneously with the beginning of each winding cycle to change the tape running speed when the number of pulses reaches the predetermined value. Therefore, the method of the present invention can be carried out by a relatively simple and inexpensive circuit. Further, in the method of the present invention, since the tape running speed is digitally controlled, the winding operation can be precisely controlled, whereby the recording tape can be wound in a good state with less variation in winding state among successively wound reels.

Though in the apparatus shown in FIG. 1, the pulse train is obtained by the encoder associated with the take-up motor 5, the encoder may be associated with the feed-out motor 4 or the pass roll section 3. Further, the gradually increasing voltage indicated at 21 in FIG. 2 and the gradually decreasing voltage indicated at 23 in FIG. 2 are normally generated using a CR charge and discharge circuit. However, they may be generated by converting the digital patterns of a preset gradually increasing curve and a preset gradually decreasing curve into analog patterns using a D/A converter. Further, in the apparatus shown in FIG. 1, each winding cycle is ended when the count of the pulse generator 6 reaches the predetermined value CB. However, each winding cycle may be ended when a leader tape intervening between successive recording tapes in the roll tape wound around the large reel 1 is detected by a suitable means.

Further, in accordance with the method of the present invention all timing operations for changing the tape running speed e.g., timing for keeping the tape running speed constant at the high speed can be controlled by counting the number of pulses in the train and changing the tape running speed when the number of the pulses reaches a predetermined value corresponding to the timing.

We claim:

1. A method of winding a predetermined length of tape fed out from a first winding frame onto a second winding frame in which the running speed of the tape is changed in at least two steps, comprising the steps of: generating, concurrently with the beginning of each winding cycle, a train of pulses, the number of which is proportional to the number of rotations of one of the winding frames, and changing the running speed of the tape when the number of pulses in the pulse train reaches a predetermined value corresponding to the time period during which a predetermined length of the tape is wound up onto the second winding frame and at the end of which the running speed of the tape is to be changed.

2. A method of winding a tape as defined in claim 1, in which the running speed of the tape is gradually increased at the beginning stage of each winding cycle to a predetermined high speed, is subsequently kept substantially constant at the predetermined high speed, and the running speed of the tape is changed to gradually slow down when the number of the pulses in said pulse train reaches a predetermined value corresponding to the time period during which a first predetermined length of the tape is wound up and at the end of which the running speed is to be gradually slowed down.

3. A method of winding a tape as defined in claim 2, in which said tape is stopped when the number of pulses in the pulse train reaches a predetermined value corresponding to the time period during which a second predetermined length of the tape is wound up and at the end of which the tape is to be stopped.

* * * * *